United States Patent
Ogawa et al.

(10) Patent No.: US 10,846,038 B2
(45) Date of Patent: Nov. 24, 2020

(54) IMAGE PROCESSING SYSTEM, AND METHOD WITH ONE OR MORE PROCESSING DEVICES

(71) Applicant: SHARP KABUSHIKI KAISHA, Sakai (JP)

(72) Inventors: Kazuma Ogawa, Sakai (JP); Sho Tsujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/186,322

(22) Filed: Nov. 9, 2018

(65) Prior Publication Data

US 2019/0146736 A1 May 16, 2019

(30) Foreign Application Priority Data

Nov. 10, 2017 (JP) .................................. 2017-217345

(51) Int. Cl.
*G06F 3/12* (2006.01)

(52) U.S. Cl.
CPC .......... *G06F 3/1261* (2013.01); *G06F 3/1212* (2013.01); *G06F 3/1291* (2013.01)

(58) Field of Classification Search
None
See application file for complete search history.

(56) References Cited

U.S. PATENT DOCUMENTS

| | | | |
|---|---|---|---|
| 9,348,545 B2 | 5/2016 | Sasaki | |
| 2013/0063774 A1* | 3/2013 | Nuggehalli | G06F 3/1298 358/1.15 |
| 2013/0155455 A1* | 6/2013 | Ueda | G06F 3/1247 358/1.15 |
| 2015/0212781 A1* | 7/2015 | Sasaki | G06F 3/1247 358/1.15 |
| 2016/0364193 A1* | 12/2016 | Yu | H04N 1/00347 |
| 2017/0289392 A1* | 10/2017 | Hwang | H04N 1/23 |

FOREIGN PATENT DOCUMENTS

| | | |
|---|---|---|
| JP | 2002-016733 A | 1/2002 |
| JP | 2012060571 A | 3/2012 |
| JP | 2015-157473 A | 9/2015 |

* cited by examiner

*Primary Examiner* — Henok Shiferaw
(74) *Attorney, Agent, or Firm* — ScienBiziP, P.C.

(57) ABSTRACT

An image processing system includes plural image processing devices connected with each other by a network. In the one image processing device, in a case where a new job accepted by a job accepting unit may not be executed immediately, a control unit transmits image data related to the job to the other image processing device capable of image processing and causes the other image processing device to execute image processing. In the other image processing device, the control unit assesses whether or not an image processing result is to be returned to the one image processing device, and transmits the image processing result to the one image processing device to execute a final process if assessed to return the image processing result, but executes the final process of the image processing result in the other image processing device if assessed not to return the image processing result.

6 Claims, 12 Drawing Sheets

IMAGE PROCESSING SYSTEM, AND METHOD WITH ONE OR MORE PROCESSING DEVICES

BACKGROUND

1. Field

The present disclosure relates to an image processing system, an image processing method, and an image processing program.

2. Description of the Related Art

In related art, in an image processing device that has an image processing function such as a scanner, in a case where the image processing device is already performing image processing for another job when the image processing device newly accepts a new job for which image processing is to be performed, the image processing device may not start the image processing for the new job until the image processing for the other job is completed. Further, there has been a problem that time is requested until completion of processing in a case where the processing amount of image processing is large.

To handle such a problem, a technology has been disclosed in which in a case where a facsimile function of a subject device is in use, image transmission is performed by using the facsimile function of another device connected with a network in which the facsimile function is in an idle mode, a latency time in transmitting an image is thereby decreased, and convenience for a user is improved (for example, Japanese Unexamined Patent Application Publication No. 2002-016733).

Further, a technology has also been disclosed in which transmittable data are transmitted to an external device before a preview instruction or a print instruction is accepted from a user, processing target data for which image processing has already been performed in the external device are thereafter received, preprocessing is thereby performed efficiently, a waiting time of the user is decreased as much as possible, and operability is thereby improved (for example, Japanese Unexamined Patent Application Publication No. 2015-157473).

Incidentally, in a case of a network that is formed of plural image processing devices with complex functions such as a multifunctional peripheral (MFP) that has a printing function such as copying, a scanner function, and transmission functions such as E-mail and a facsimile (FAX), how an image processing result is to be finally processed largely differs depending on the kind of job.

However, an image processing system in related art has been specialized only in image processing for a specific job and may not necessarily have realized appropriate allocation of image processing in accordance with the kind of job.

It is desirable to provide an image processing system, an image processing method, and an image processing program that enable appropriate allocation of image processing in accordance with the kind of job in a network formed with plural image processing devices.

SUMMARY

The present disclosure provides an image processing system including plural image processing devices that are connected with each other by a network. The image processing device includes: a job accepting unit that accepts a job related to image processing; an image processing unit that performs image processing of image data related to the job; a communication unit that performs communication with the other image processing device on the network; and a control unit. In the one image processing device, in a case where a new job accepted by the job accepting unit is not able to be immediately executed, the control unit transmits the image data related to the job to the other image processing device that is capable of image processing and causes the other image processing device to execute the image processing. In the other image processing device, the control unit assesses whether or not an image processing result is to be returned to the one image processing device, and transmits the image processing result to the one image processing device to cause the one image processing device to execute a final process in a case where an assessment is made that the image processing result is to be returned, but executes the final process of the image processing result in the other image processing device in a case where an assessment is made that the image processing result is not to be returned.

Further, the present disclosure provides an image processing system including plural image processing devices that are connected with each other by a network. The image processing device includes: a job accepting unit that accepts a job related to image processing; an image processing unit that performs image processing of image data related to the job; a communication unit that performs communication with the other image processing device on the network; and a control unit. In the one image processing device, in a case where the other image processing device that is capable of image processing is present when the job accepting unit accepts a job, the control unit divides the image data related to the job to cause the one image processing device and the other image processing device to respectively execute image processing, and integrates image processing results related to the job to execute a final process in the one image processing device in a case where the job is a job that is concluded only in the one image processing device.

Further, the present disclosure provides an image processing system including plural image processing devices that are connected with each other by a network. The image processing device includes: a job accepting unit that accepts a job related to image processing; an image processing unit that performs image processing of image data related to the job; a communication unit that performs communication with the other image processing device on the network; and a control unit. In the one image processing device, in a case where the other image processing device that is capable of image processing is present when the job accepting unit accepts a job, the control unit divides the image data related to the job to cause the one image processing device and the other image processing device to respectively execute image processing, compares sizes of data amounts of image processing results, which are related to the job, by the one image processing device and the other image processing device in a case where the job is not a job that is concluded only in the one image processing device, and integrates image processing results related to the job to execute a final process in the other image processing device in a case where the data amount of the image processing result by the one image processing device is not larger than the data amount of the image processing result by the other image processing device.

Further, the present disclosure provides an image processing method of an image processing system including plural image processing devices that are connected with each other by a network. The image processing method includes: in the one image processing device, in a case where an accepted job is not able to be immediately executed, transmitting image data related to the job to the other image processing device that is capable of image processing and causing the other image processing device to execute the image processing; assessing whether or not an image processing result is to be returned to the one image processing device in the other image processing device; and transmitting the image processing result to the one image processing device to cause the one image processing device to execute a final process in a case where an assessment is made that the image processing result is to be returned, but executing the final process of the image processing result in the other image processing device in a case where an assessment is made that the image processing result is not to be returned.

Further, the present disclosure provides an image processing program that is executed by an image processing system including plural image processing devices which are connected with each other by a network. The image processing program causing a processor of the image processing device to execute a process including: in the one image processing device, in a case where an accepted job is not able to be immediately executed, transmitting image data related to the job to the other image processing device that is capable of image processing and causing the other image processing device to execute the image processing; assessing whether or not an image processing result is to be returned to the one image processing device in the other image processing device; and transmitting the image processing result to the one image processing device to cause the one image processing device to execute a final process in a case where an assessment is made that the image processing result is to be returned, but executing the final process of the image processing result in the other image processing device in a case where an assessment is made that the image processing result is not to be returned.

BRIEF DESCRIPTION OF THE DRAWINGS

FIG. 6A and FIG. 6B are flowcharts that illustrate details of process 1 in FIG. 5, in which FIG. 6A illustrates a process by the subject device and FIG. 6B illustrates a process by the other device;

FIG. 7A and FIG. 7B are flowcharts that illustrate details of process 2 in FIG. 5, in which FIG. 7A illustrates a process by the subject device and FIG. 7B illustrates a process by the other device;

FIG. 8A and FIG. 8B are flowcharts that illustrate details of process 3 in FIG. 5, in which FIG. 8A illustrates a process by the subject device and FIG. 8B illustrates a process by the other device;

FIG. 9A and FIG. 9B are flowcharts that illustrate details of process 4 in FIG. 5, in which FIG. 9A illustrates a process by the subject device and FIG. 9B illustrates a process by the other device;

DESCRIPTION OF THE EMBODIMENTS

Figure 1:
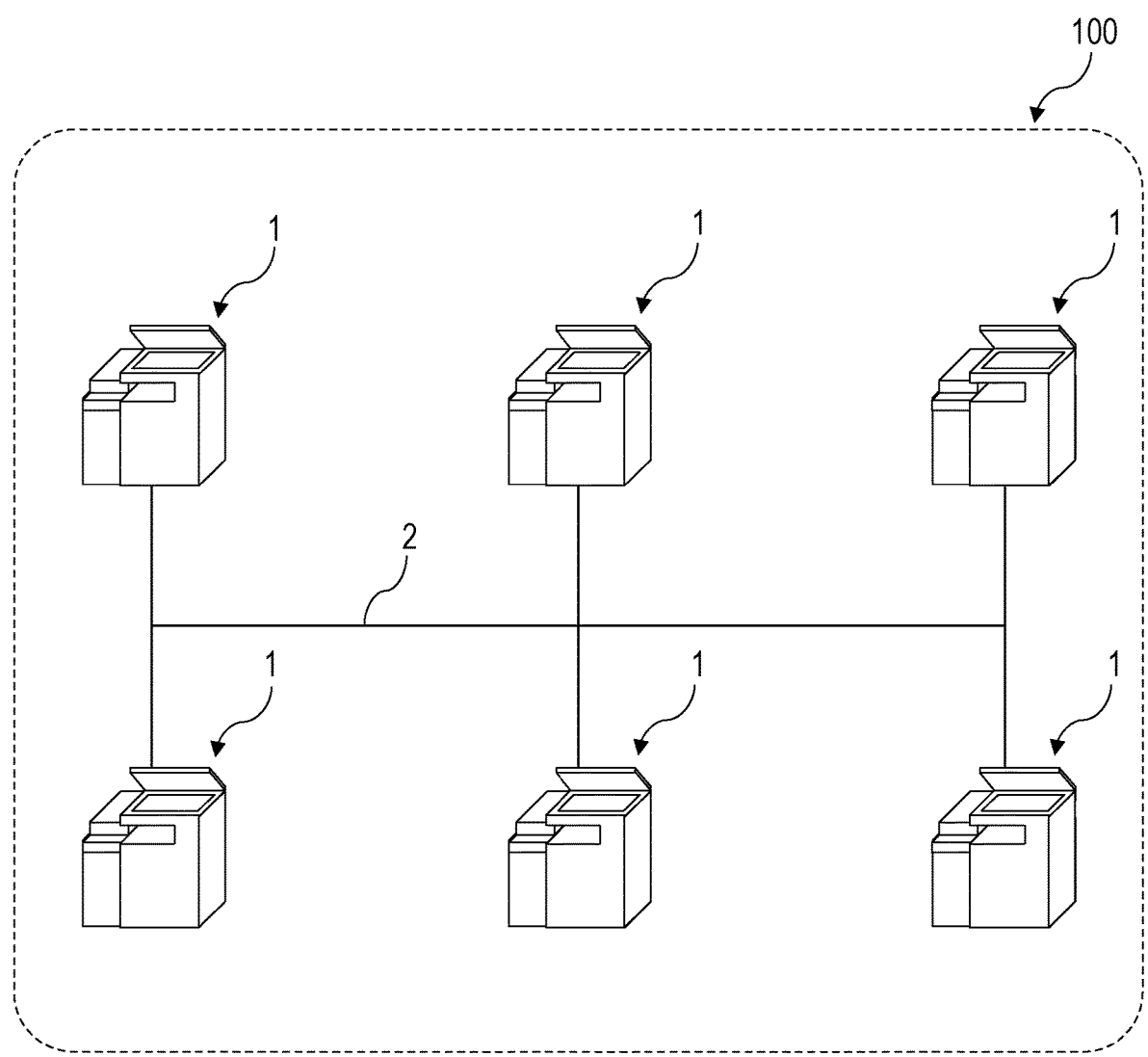
FIG. 1 is an explanatory diagram that illustrates a configuration of an image processing system which includes an image processing device according to a first embodiment of the present disclosure.

As described above, (1) An image processing system of the present disclosure is an image processing system including plural image processing devices that are connected with each other by a network. The image processing device includes: a job accepting unit that accepts a job related to image processing; an image processing unit that performs image processing of image data related to the job; a communication unit that performs communication with the other image processing device on the network; and a control unit. In the one image processing device, in a case where a new job accepted by the job accepting unit is not able to be immediately executed, the control unit transmits the image data related to the job to the other image processing device that is capable of image processing and causes the other image processing device to execute the image processing. In the other image processing device, the control unit assesses whether or not an image processing result is to be returned to the one image processing device, and transmits the image processing result to the one image processing device to cause the one image processing device to execute a final process in a case where an assessment is made that the image processing result is to be returned, but executes the final process of the image processing result in the other image processing device in a case where an assessment is made that the image processing result is not to be returned.

Further, an image processing system of the present disclosure is an image processing system including plural image processing devices that are connected with each other by a network. The image processing device includes: a job accepting unit that accepts a job related to image processing; an image processing unit that performs image processing of image data related to the job; a communication unit that performs communication with the other image processing device on the network; and a control unit. In the one image processing device, in a case where the other image processing device that is capable of image processing is present when the job accepting unit accepts a job, the control unit divides the image data related to the job to cause the one image processing device and the other image processing device to respectively execute image processing, and integrates image processing results related to the job to execute a final process in the one image processing device in a case where the job is a job that is concluded only in the one image processing device.

Further, an image processing system of the present disclosure is an image processing system including plural image processing devices that are connected with each other by a network. The image processing device includes: a job accepting unit that accepts a job related to image processing; an image processing unit that performs image processing of image data related to the job; a communication unit that performs communication with the other image processing device on the network; and a control unit. In the one image processing device, in a case where the other image processing device that is capable of image processing is present when the job accepting unit accepts a job, the control unit divides the image data related to the job to cause the one image processing device and the other image processing device to respectively execute image processing, compares data amounts of image processing results, which are related to the job, by the one image processing device and the other image processing device in a case where the job is not a job that is concluded only in the one image processing device, and integrates image processing results related to the job to execute a final process in the other image processing device in a case where the data amount of the image processing result, which is related to the job, by the one image processing device is not larger than the data amount of the image processing result, which is related to the job, by the other image processing device.

Further, an image processing method of the present disclosure is an image processing method of an image processing system including plural image processing devices that are connected with each other by a network. The image processing method includes: in the one image processing device, in a case where an accepted job is not able to be immediately executed, transmitting image data related to the job to the other image processing device that is capable of image processing and causing the other image processing device to execute the image processing; assessing whether or not an image processing result is to be returned to the one image processing device in the other image processing device; and transmitting the image processing result to the one image processing device to cause the one image processing device to execute a final process in a case where an assessment is made that the image processing result is to be returned, but executing the final process of the image processing result in the other image processing device in a case where an assessment is made that the image processing result is not to be returned.

Further, an image processing program of the present disclosure is an image processing program that is executed by an image processing system including plural image processing devices which are connected with each other by a network. The image processing program causing a processor of the image processing device to execute a process including: in the one image processing device, in a case where an accepted job is not able to be immediately executed, transmitting image data related to the job to the other image processing device that is capable of image processing and causing the other image processing device to execute the image processing; assessing whether or not an image processing result is to be returned to the one image processing device in the other image processing device; and transmitting the image processing result to the one image processing device to cause the one image processing device to execute a final process in a case where an assessment is made that the image processing result is to be returned, but executing the final process of the image processing result in the other image processing device in a case where an assessment is made that the image processing result is not to be returned.

In the present disclosure, "image processing device" is a device that has complex functions such as forming and outputting an image and transmitting image data, such as a multifunctional peripheral (MFP) that has a printing function such as copying, a scanner function, and transmission functions such as E-mail and a facsimile (FAX).

Further, as "a case where a new job accepted by the job accepting unit is not able to be immediately executed", cases such as a case where the image processing related to a preceding job is being executed when the job accepting unit accepts a new job may be raised.

Note that the assessment about whether or not the image processing result is to be returned to the one image processing device may be performed by the control unit of the one image processing device.

In a case where an assessment is made that the image processing result is to be returned to the one image processing device, the control unit of the one image processing device transmits a demand that the image processing result be returned to the one image processing device.

Desirable aspects of the present disclosure will further be described.

(2) As for the image processing system according to the present disclosure, in the one image processing device, in a case where the new job accepted by the job accepting unit is not able to be immediately executed due to a preceding job, the control unit may assess whether or not the new job is concluded only in the one image processing device, and may transmit the image data related to the new job to the other image processing device that is capable of the image processing to cause the other image processing device to execute the image processing in a case where an assessment is made that the new job is not a job that is concluded only in the one image processing device.

Accordingly, whether or not the new job is to be entrusted to the other image processing device is decided in accordance with whether or not the new job is concluded only in the one image processing device. Thus, an image processing system may be realized which enables appropriate allocation of image processing in accordance with the kind of job.

"A job that is concluded only in the one image processing device" is a job in which image data generated by scanning are displayed by the one image processing device or are saved in a USB connected with the one image processing device, or the like, for example.

(3) As for the image processing system according to the present disclosure, in the one image processing device, in a case where the new job accepted by the job accepting unit is not able to be immediately executed due to a preceding job, the control unit may assess whether or not the preceding job is concluded only in the one image processing device, and may transmit the image data related to the preceding job to the other image processing device that is capable of the image processing to cause the other image processing device to execute the image processing in a case where an assessment is made that the preceding job is not a job that is concluded only in the one image processing device.

Accordingly, whether or not the preceding job is to be entrusted to the other image processing device is decided in accordance with whether or not the preceding job is concluded only in the one image processing device. Thus, the image processing system may be realized which enables appropriate allocation of image processing in accordance with the kind of job.

(4) As for the image processing system according to the present disclosure, in the one image processing device, in a case where the new job accepted by the job accepting unit is not able to be immediately executed due to a preceding job, the control unit may assess whether or not the new job and the preceding job are concluded only in the one image processing device, may assess whether or not the new job is to be prioritized over the preceding job in a case where an assessment is made that both of the new job and the preceding job are concluded only in the one image processing device, and may transmit the image data related to the preceding job to the other image processing device that is capable of the image processing to cause the other image processing device to execute the image processing in a case where an assessment is made that the new job is to be prioritized over the preceding job.

Accordingly, whether or not the preceding job is to be entrusted to the other image processing device is decided in accordance with whether or not the new job and the preceding job are concluded only in the one image processing device and with whether or not the new job is to be prioritized over the preceding job. Thus, the image processing system may be realized which enables appropriate allocation of image processing in accordance with the kind of job.

The present disclosure will hereinafter be described more in detail with reference to the drawings. Note that the following descriptions are exemplary in all points and are not to be understood that those limit the present disclosure.

First Embodiment

<Configuration of Image Processing System 100>

In the following, a configuration of an image processing system 100 according to a first embodiment of the present disclosure will be described based on FIG. 1 and FIG. 2.

FIG. 1 is an explanatory diagram that illustrates the configuration of the image processing system 100 which includes an image processing device 1 according to the first embodiment of the present disclosure. Further, FIG. 2 is a block diagram that illustrates an outline configuration of the image processing device 1 of FIG. 1.

As illustrated in FIG. 1, the image processing system 100 of the present disclosure is configured with plural image processing devices 1 that are connected with each other by a network 2.

The image processing device 1 is a device that processes and outputs image data generated by reading an original document, such as a multifunctional peripheral (MFP) that has a printing function such as copying, a scanner function, and transmission functions such as E-mail and a facsimile (FAX).

The network 2 is a network such as an intracompany network that connects plural image processing devices 1.

As the network 2, for example, a LAN, a wide area network (WAN) such as the Internet, a dedicated communication line, or the like may be raised.

<Outline Configuration of Image Processing Device 1>

Figure 2:
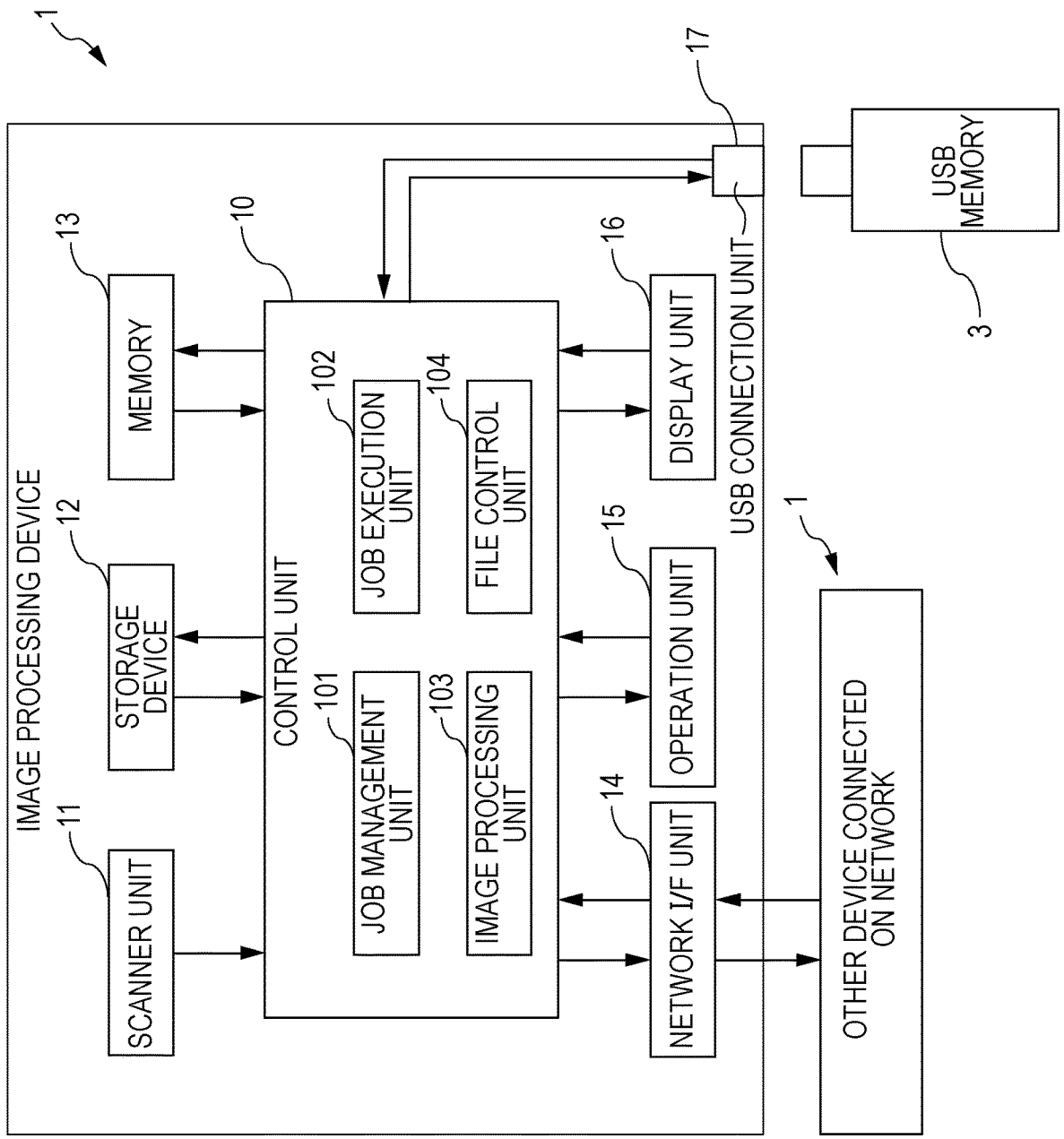
FIG. 2 is a block diagram that illustrates an outline configuration of the image processing device of FIG. 1.

As illustrated in FIG. 2, the image processing device 1 of the present disclosure includes a control unit 10, a scanner unit 11, a storage device 12, a memory 13, a network I/F unit 14, an operation unit 15, a display unit 16, and a USB connection unit 17.

In the following, the configuration elements of the image processing device 1 will be described.

The control unit 10 integrally controls the image processing device 1 and is formed with a CPU, a RAM, a ROM, various interface circuits, and so forth.

The control unit 10 includes a job management unit 101, a job execution unit 102, an image processing unit 103, and a file control unit 104.

The job management unit 101 is a portion that performs registration, deletion, and stop of a job.

In a case where the registered job is executable, the job management unit 101 performs an execution demand on the job execution unit 102.

The job execution unit 102 is a portion that executes the job for which the execution demand is accepted from the job management unit 101.

The job management unit 101 performs an image processing demand about image data on the image processing unit 103, creation of scan transmission data from an image processing result, a data transmission-reception demand on the network I/F unit 14, and so forth.

The image processing unit 103 is a portion that performs image processing such as compression and expansion of an image, image data correction and conversion, and character recognition in response to the image processing demand that is demanded by the job execution unit 102.

The file control unit 104 is a portion that performs saving or readout of a file in or from an HDD, which is not illustrated, deployment of a file to the memory 13, and so forth.

The scanner unit 11 is a portion that reads an original document which is set on an original document reading table or an automatic original document reading device, which is not illustrated, in a scan transmission job or the like and generates image data.

The image data generated by the scanner unit 11 are transmitted to the image processing unit 103 of the control unit 10.

The storage device 12 is a storing element or a storage medium that stores information requested for realizing various functions of the image processing device 1, a control program, and so forth. For example, a semiconductor element such as a RAM or a ROM, or a storage medium such as a hard disk drive (HDD), a flash storage unit, or an SSD is used.

Note that a program and data may be retained in different devices in such a manner that a region for retaining data is configured with the hard disk drive and a region for retaining a program is configured with the flash storage unit.

The memory 13 represents a region or the like in which an image is temporarily deployed in order to perform image processing of a scanned image or the like.

The network I/F unit 14 is a portion that communicates with the other devices that are connected on the network 2 and performs transmission and reception of data.

The operation unit 15 is an interface for performing an operation of the image processing device 1.

A user operates the operation unit 15 and thereby executes an instruction for the image processing device 1. The operation unit 15 may be physical keys formed with plural aligned keys or may be a unit that is operated by touches or the like on a touch panel provided to the display unit 16.

The display unit 16 is a portion that performs display of various kinds of information.

The display unit 16 is configured with a CRT display, a liquid crystal display, an EL display, or the like, for example, and is a display device such as a monitor or a line display for displaying electronic data such as a processing state or the like of an operating system or application software. The control unit 10 performs display of an action and a state of the image processing device 1 through the display unit 16.

The USB connection unit 17 is a connection unit with which a USB memory 3 or another USB apparatus is detachably connected.

<Image Processing Procedures of Image Processing System 100 According to First Embodiment of the Present Disclosure>

Next, a specific example of image processing procedures of the image processing system 100 according to the first embodiment of the present disclosure will be described based on FIG. 3 and FIG. 4.

Figure 3:
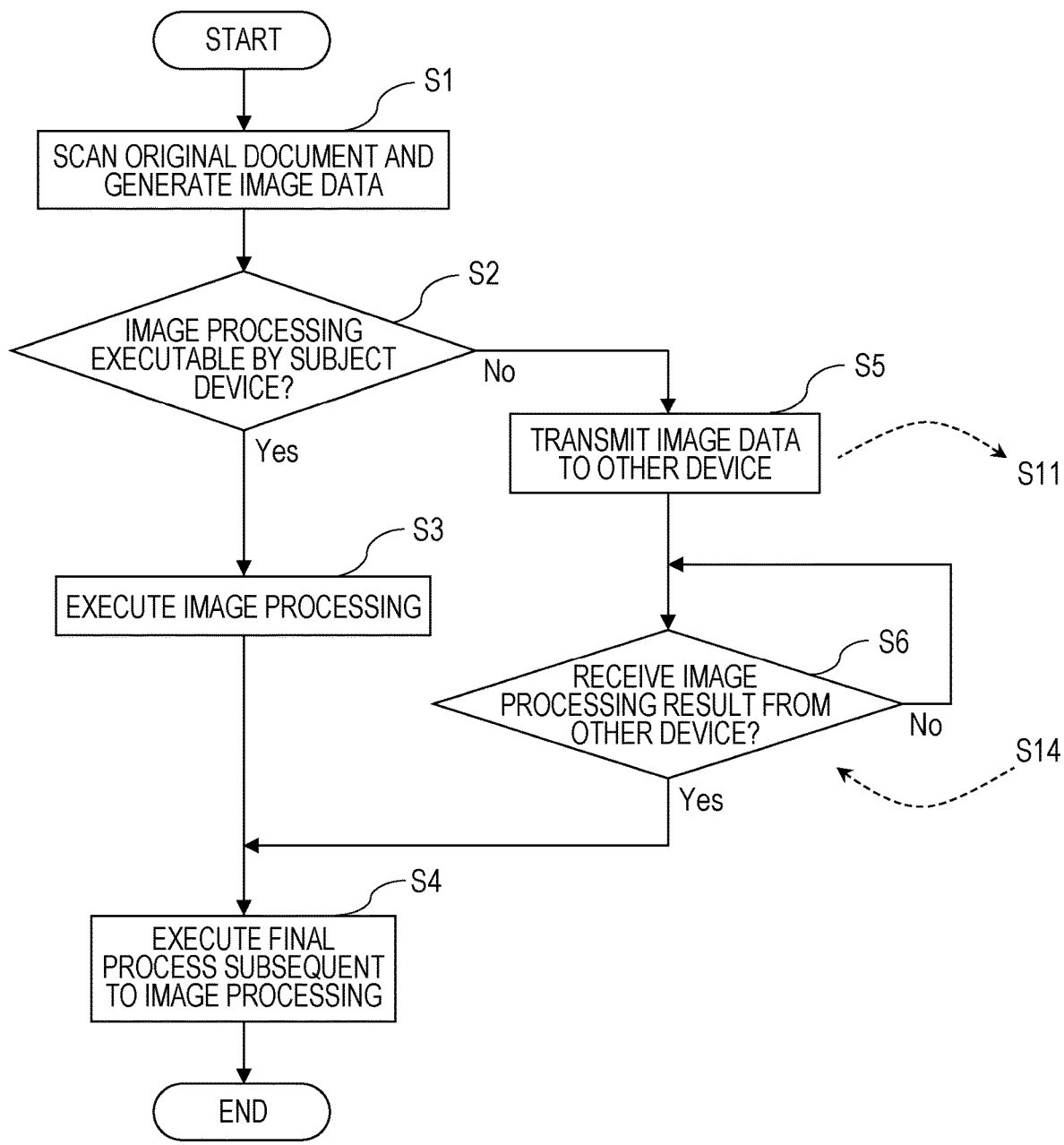
FIG. 3 is a flowchart that illustrates image processing procedures of one image processing device (subject device) which scans an original document in the image processing system according to the first embodiment of the present disclosure.

FIG. 3 is a flowchart that illustrates image processing procedures of one image processing device 1 (subject device) which scans an original document in the image processing system 100 according to the first embodiment of the present disclosure. Further, FIG. 4 is a flowchart that illustrates image processing procedures of another image processing device 1 (other device) which receives image data in the image processing system 100 according to the first embodiment of the present disclosure.

The control unit 10 performs a process following procedures described in the following steps.

Note that in the following description, the one image processing device 1 that scans the original document will be referred to as "subject device", and the other image processing device 1 to which the subject device entrusts image processing will be referred to as "other device".

Figure 4:
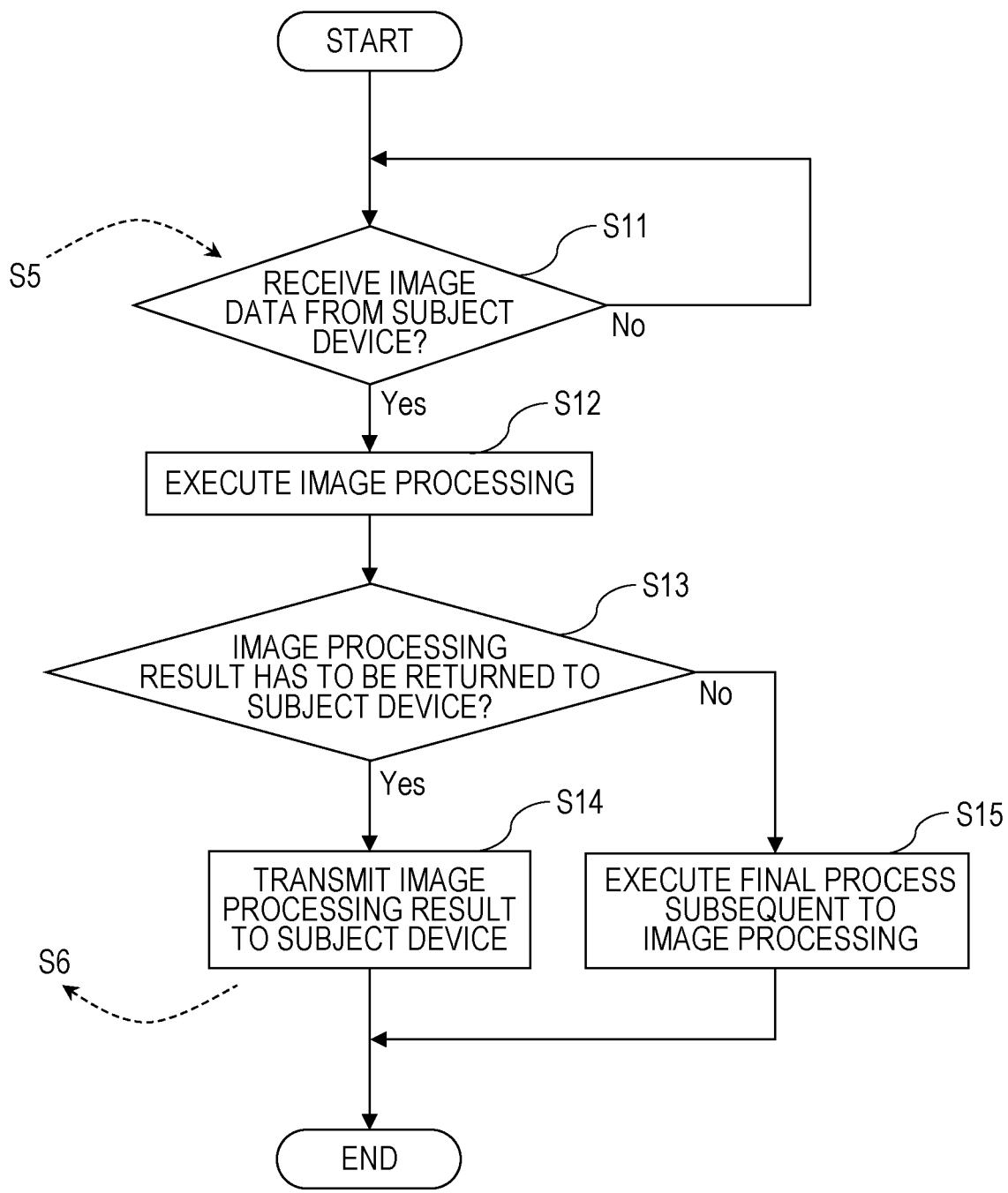
FIG. 4 is a flowchart that illustrates image processing procedures of another image processing device (other device) which receives image data in the image processing system according to the first embodiment of the present disclosure.

Further, in FIG. 3, processes of steps S5 and S6 respectively correspond to steps S11 and S14 in FIG. 4.

In step S1 in FIG. 3, the control unit 10 of the subject device causes the scanner unit 11 to scan the original document and generates image data (step S1).

Specifically, when the execution demand for a scan job is accepted from the job management unit 101, the control unit 10 causes the job execution unit 102 to execute the scan job.

The job execution unit 102 causes the scanner unit 11 to read the original document that is set on the original document reading table or the automatic original document reading device, which is not illustrated, and to generate image data.

Next, in step S2, the control unit 10 assesses about the image data generated by the scanner unit 11 whether or not the image processing is executable by the subject device (step S2).

In a case where the image processing is executable by the subject device (a case where the assessment in step S2 is Yes), in step S3, the control unit 10 causes the image processing unit 103 to execute the image processing of the image data related to the job (step S3).

Subsequently, in step S4, the control unit 10 executes a final process subsequent to the image processing (step S4).

Here, the final process subsequent to the image processing differs depending on the kind of job.

For example, in a case of a job in which the image processing result is transmitted by electronic mail, the final process subsequent to the image processing is creation of the electronic mail for transmitting the image processing result or a transmission process.

Further, in a case of a job in which the image processing result is stored in the USB memory 3 connected with the USB connection unit 17 of the subject device, the final process subsequent to the image processing is a process of storing the image processing result in the USB memory 3.

Further, in a case of a job in which the image processing result is displayed on the display unit 16 of the subject device, the final process subsequent to the image processing is a process of displaying the image processing result on the display unit 16.

Further, in a case of a job in which the image processing result is stored in the storage device 12 of the subject device, the final process subsequent to the image processing is a process of storing the image processing result in the storage device 12.

On the other hand, in the assessment in step S2, in a case where the image processing is not executable by the subject device (a case where the assessment in step S2 is No), in step S5, the control unit 10 causes the network I/F unit 14 to transmit the image data to the other device (step S5).

In this case, the control unit 10 causes the network I/F unit 14 to transmit the image data in association with an instruction on the image processing that the control unit 10 requests the other device to perform.

Here, "the image processing is not executable" means cases such as a case where the image processing unit 103 is already in a state of executing the image processing for another job and may not start a new job until the image processing for the other job is completed, for example.

Particularly, because time is requested until completion of the image processing in a case where the data amount of the other job is large, it is expected that the process is more quickly completed by causing the other device to perform the image processing for the new job than by performing the image processing for the new job by the subject device, that is, by performing the image processing only by the subject device.

Further, the other device is selected from the other image processing devices 1 that are capable of executing the image processing on the network 2.

Further, in a case where plural alternative other devices are present, the other device is selected in which the delay in response to a demand by the subject device is shortest.

Next, in step S6, the control unit 10 assesses whether or not the image processing result related to the job is received from the other device (step S6).

In a case where the image processing result related to the job is received from the other device (a case where the assessment in step S6 is Yes), the control unit 10 performs a process of step S4 (step S4).

On the other hand, in a case where the image processing result related to the job is not received from the other device (a case where the assessment in step S6 is No), the control unit 10 repeats the assessment in step S6 (step S6).

Next, based on FIG. 4, a description will be made about a process by the other device to which the subject device entrusts the image processing.

In step S11 in FIG. 4, the control unit 10 of the other device assesses whether or not the network I/F unit 14 receives image data from the subject device (step S1).

In a case where the network I/F unit 14 receives the image data from the subject device (a case where the assessment in step S11 is Yes), in step S12, the control unit 10 causes the image processing unit 103 to execute the image processing of the image data related to the job based on the instruction on the image processing received from the subject device (step S12).

Subsequently, the control unit 10 performs an assessment in step S13 (step S13).

On the other hand, in a case where the network I/F unit 14 does not receive the image data from the subject device (a case where the assessment in step S11 is No), the control unit 10 repeats the assessment in step S11 (step S11).

Next, in step S13, the control unit 10 assesses whether or not the image processing result related to the job has to be returned to the subject device (step S13).

In a case where the image processing result related to the job has to be returned to the subject device (a case where the assessment in step S13 is Yes), in step S14, the control unit 10 causes the network I/F unit 14 to transmit the image processing result related to the job to the subject device (step S14).

Subsequently, the control unit 10 finishes the process.

Here, a case where the image data whose image processing has already been performed have to be returned to the subject device is a case such as a case where the character recognition of the scanned image is performed, the image processing is entrusted to the other device, and thereafter the image processing result related the job is again saved in a USB or the like connected with the subject device, for example.

On the other hand, in a case where the image processing result related to the job does not have to be returned to the subject device (a case where the assessment in step S13 is No), in step S15, the control unit 10 executes the final process subsequent to the image processing (step S15).

Subsequently, the control unit 10 finishes the process.

Here, a case where the image processing result does not have to be returned to the subject device is a case such as a case where the character recognition of the scanned image is performed, the image processing is entrusted to the other device, and the processed image data are thereafter transmitted to a PC on the network 2 by E-mail or the like, for example.

Further, the final process subsequent to the image processing is creation of the electronic mail for transmitting the image processing result, a transmission process, or the like, in a case of the job in which the image processing result is transmitted by electronic mail, for example.

As a specific assessment method for assessing whether or not the image processing result is to be returned to the subject device, for example, the following assessment method (1) or (2) may be raised.

(1) The control unit 10 of the other device receives an instruction about whether or not the image processing result is to be returned to the subject device from the subject device in association with the image data and performs a process based on the instruction.

In a case where the image processing result is not returned, the control unit 10 of the other device receives an instruction on the final process subsequent to the image processing such as transmission of electronic mail, saving of data, or printing from the subject device.

(2) The control unit 10 of the other device receives information about the final process subsequent to the image processing in association with the image data from the subject device and assesses whether or not the image processing result is to be returned to the subject device based on a content of the final process.

For example, in a case where the final process subsequent to the image processing is transmission of electronic mail, the control unit 10 of the other device performs the final process of the image processing result in the other device and thus does not return the image processing result to the subject device.

Further, in a case where the final process subsequent to the image processing is saving or printing of the image data, the control unit 10 of the other device causes the subject device to perform the final process of the image processing result and thus returns the image processing result to the subject device.

In such a manner, in the network 2 formed with plural image processing devices 1, in a case where the subject device transmits the image data to the other device and entrusts the image processing to the other device, whether or not the image processing result related to the job is again returned to the subject device is decided in accordance with the kind of job, and the image processing system 100 may thereby be realized which enables appropriate allocation of image processing in accordance with the kind of job.

Second Embodiment

Next, a configuration of the image processing system 100 according to a second embodiment of the present disclosure will be described based on FIG. 5 to FIG. 9B.

Figure 5:
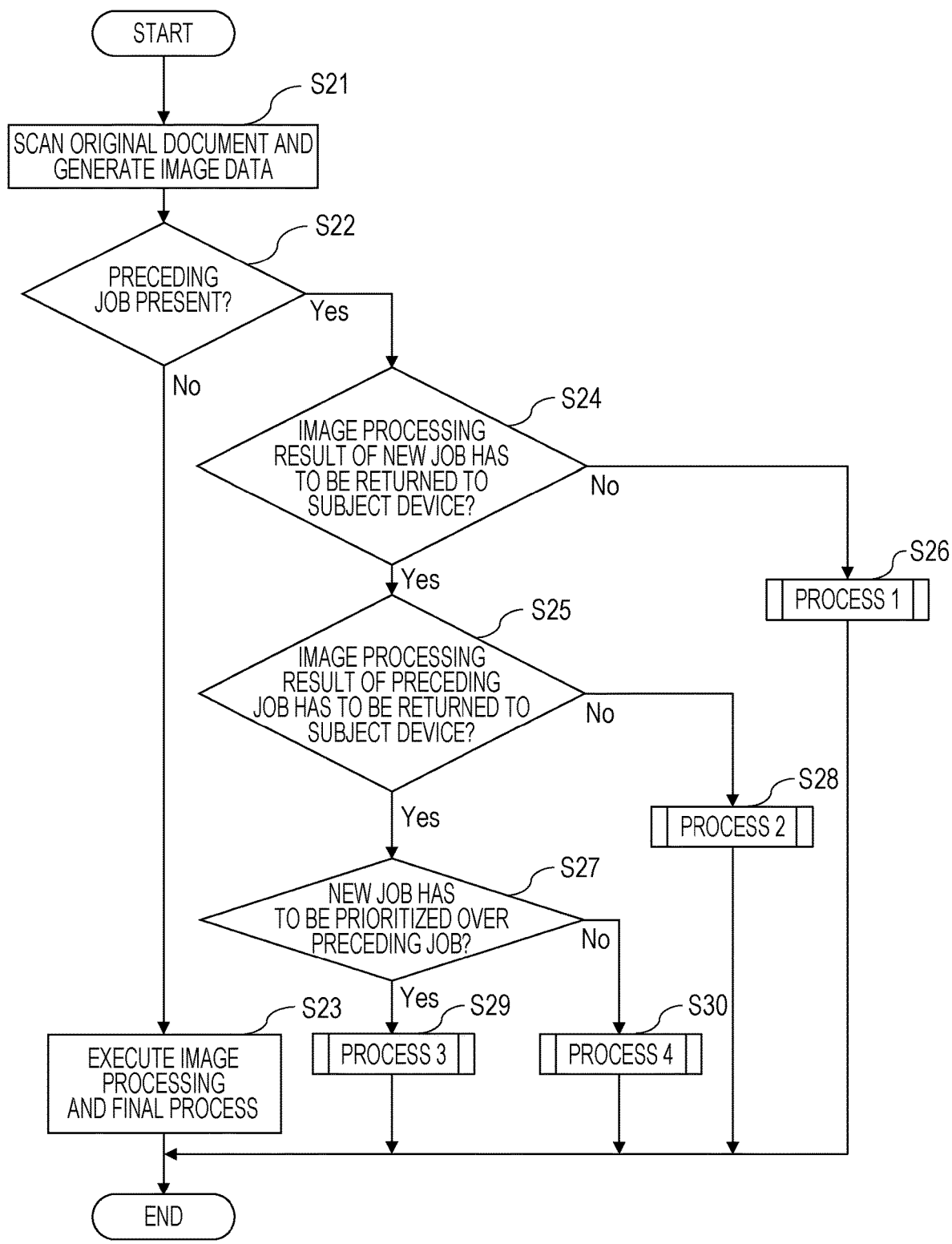
FIG. 5 is a flowchart that illustrates image processing procedures of the one image processing device (subject device) which scans an original document in the image processing system according to a second embodiment of the present disclosure.
Figure 6A:
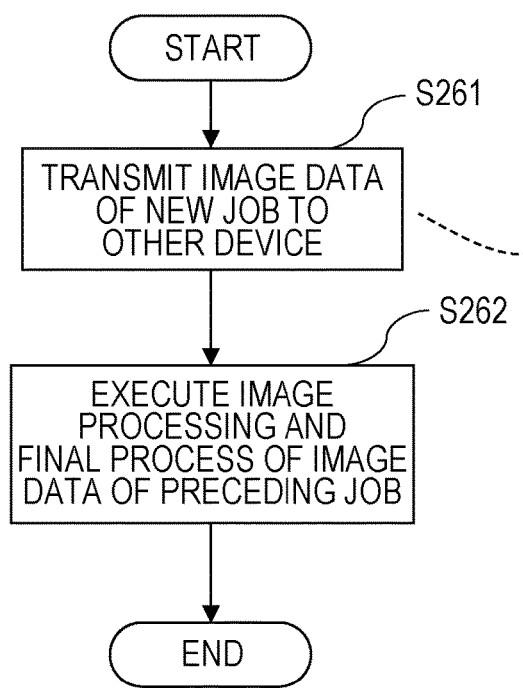
Figure 6B:
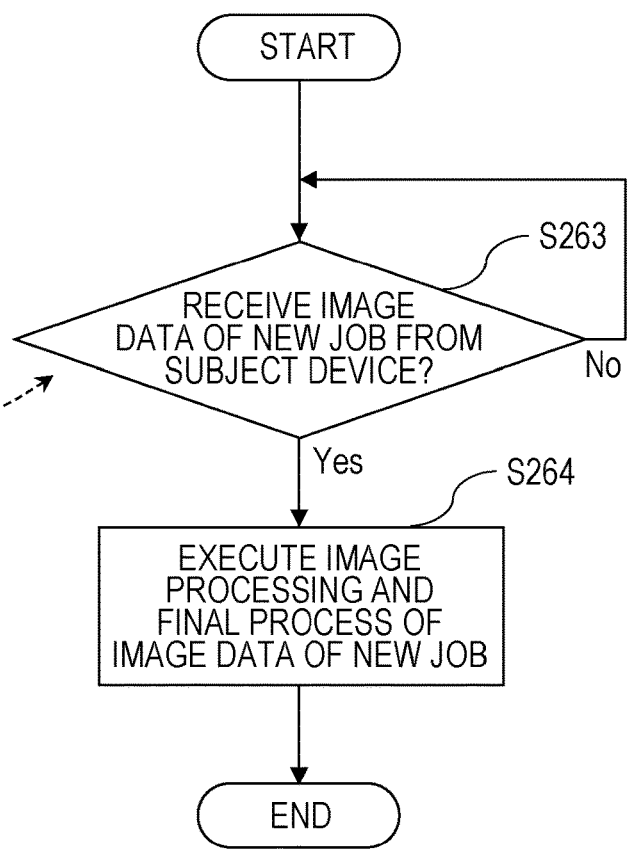
Figure 7A:
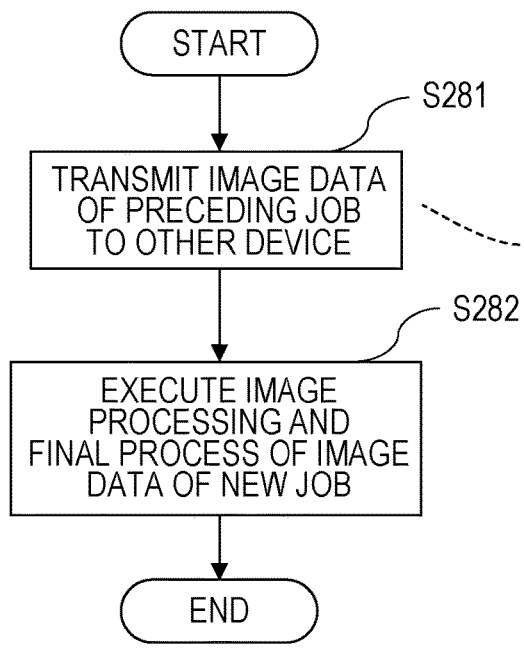
Figure 7B:
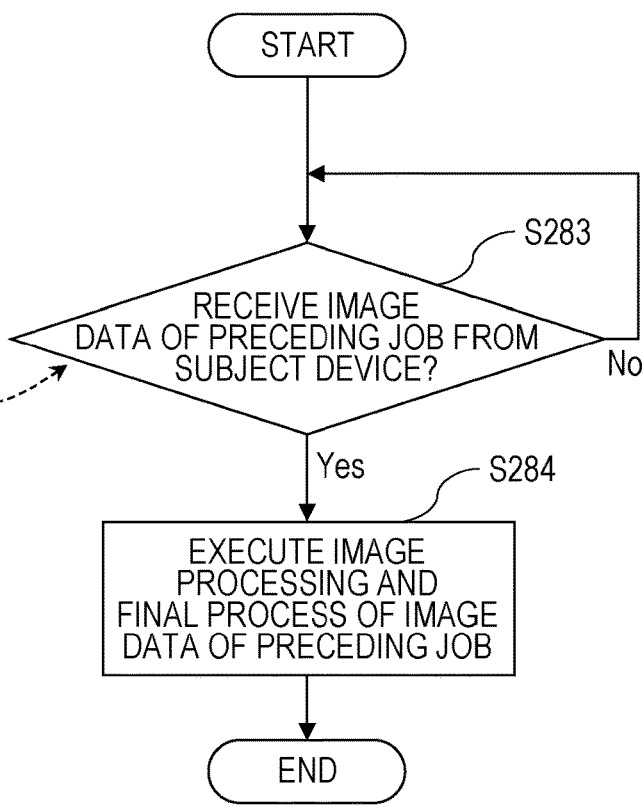
Figure 8A:
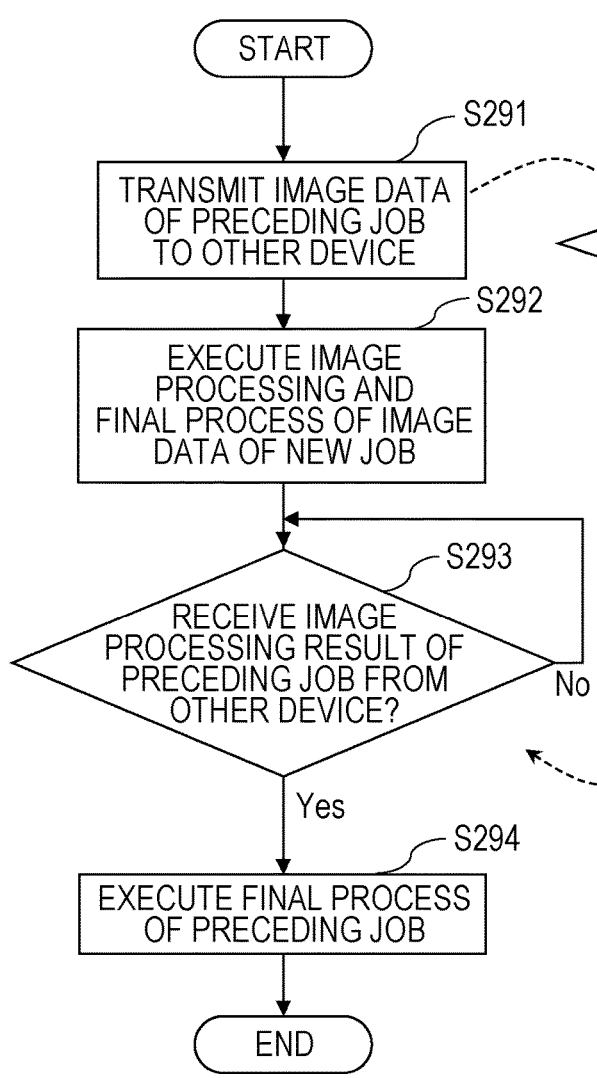
Figure 8B:
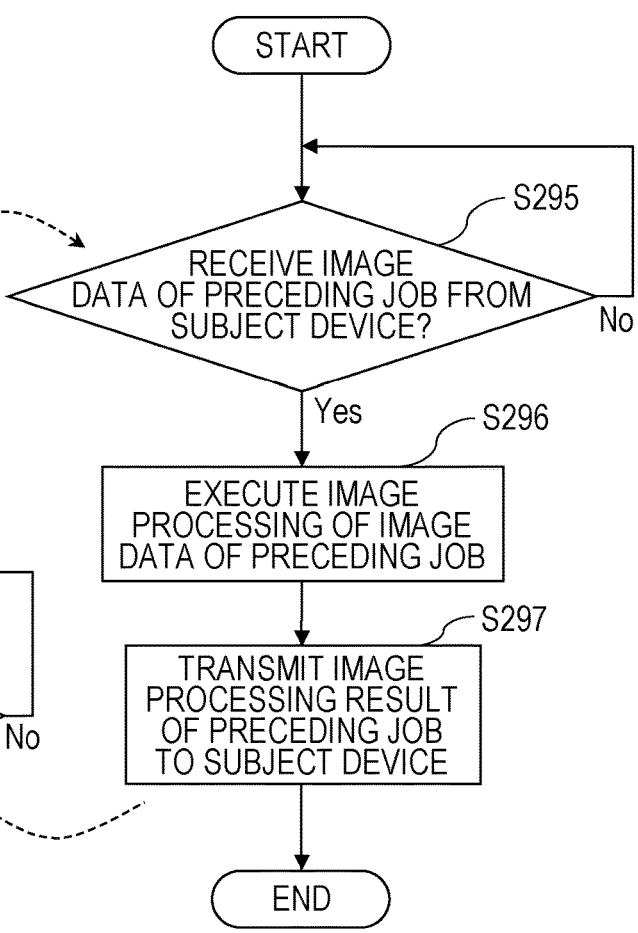
Figure 9A:
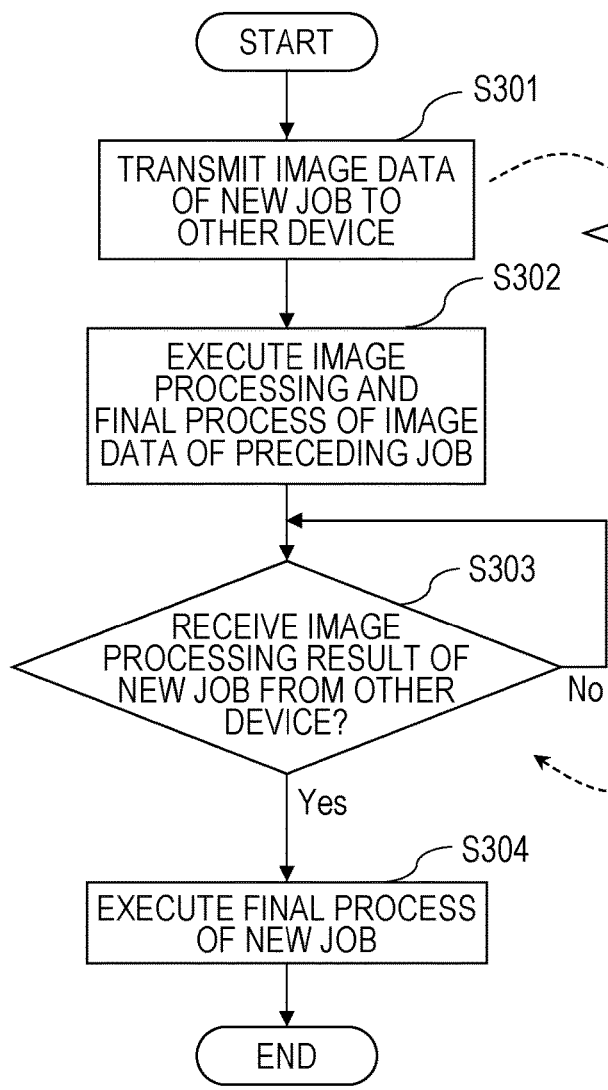
Figure 9B:
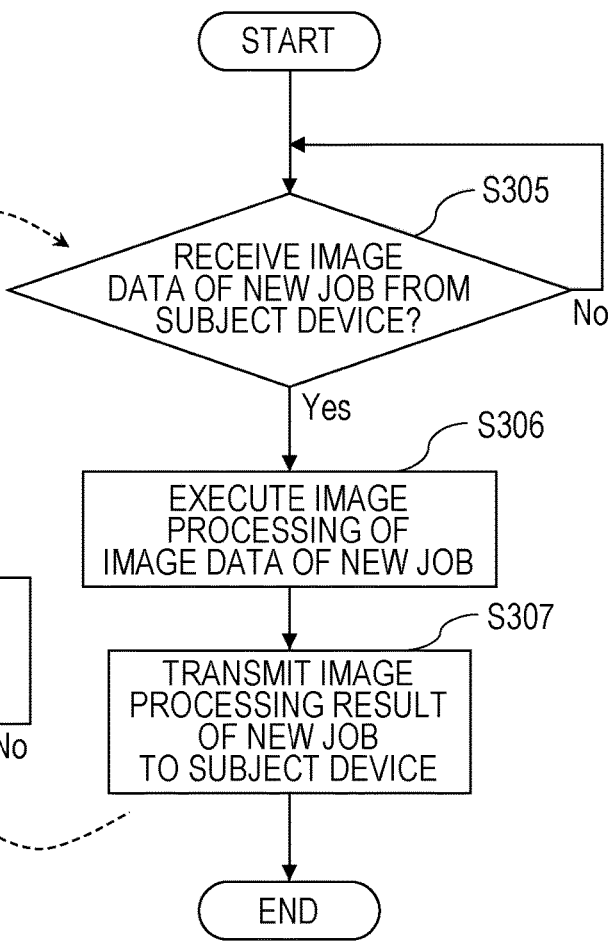

FIG. 5 is a flowchart that illustrates image processing procedures of one image processing device 1 (subject device) which scans an original document in the image processing system 100 according to the second embodiment of the present disclosure. Further, FIG. 6A and FIG. 6B are flowcharts that illustrate details of process 1 in FIG. 5, in which FIG. 6A illustrates a process by the subject device and FIG. 6B illustrates a process by the other device. Further, FIG. 7A and FIG. 7B are flowcharts that illustrate details of process 2 in FIG. 5, in which FIG. 7A illustrates a process by the subject device and FIG. 7B illustrates a process by the other device. Further, FIG. 8A and FIG. 8B are flowcharts that illustrate details of process 3 in FIG. 5, in which FIG. 8A illustrates a process by the subject device and FIG. 8B illustrates a process by the other device. FIG. 9A and FIG. 9B are flowcharts that illustrate details of process 4 in FIG. 5, in which FIG. 9A illustrates a process by the subject device and FIG. 9B illustrates a process by the other device.

In the second embodiment, a description will be made about a process in a case where a preceding job is present when the one image processing device 1 accepts a new job.

In step S21 in FIG. 5, the control unit 10 of the subject device causes the scanner unit 11 to scan an original document and generates image data (step S21).

Next, in step S22, the control unit 10 assesses whether or not a preceding job is present (step S22).

In a case where the preceding job is not present (a case where the assessment in step S22 is No), in step S23, the control unit 10 executes the image processing of the image data related to the new job and the final process of the image processing result (step S23).

Subsequently, the control unit 10 finishes the process.

On the other hand, in a case where the preceding job is present (a case where the assessment in step S22 is Yes), in step S24, the control unit 10 assesses whether or not the image processing result related to the new job has to be returned to the subject device (step S24).

In step S24, in a case where the image processing result related to the new job has to be returned to the subject device (a case where the assessment in step S24 is Yes), the control unit 10 performs an assessment in step S25 (step S25).

On the other hand, in a case where the image processing result related to the new job does not have to be returned to the subject device (a case where the assessment in step S24 is No), the control unit 10 performs process 1 of step S26 (step S26).

Note that details of process 1 of step S26 will be described later in a description about FIG. 6A and FIG. 6B.

Next, in step S25, the control unit 10 assesses whether or not the image processing result related to the preceding job has to be returned to the subject device (step S25).

In a case where the image processing result related to the preceding job has to be returned to the subject device (a case where the assessment in step S25 is Yes), the control unit 10 performs an assessment in step S27 (step S27).

On the other hand, in a case where the image processing result related to the preceding job does not have to be returned to the subject device (a case where the assessment in step S25 is No), the control unit 10 performs process 2 of step S28 (step S28).

Note that details of process 2 of step S28 will be described later in a description about FIG. 7A and FIG. 7B.

Next, in step S27, the control unit 10 assesses whether or not the image processing has to be performed while the new job is prioritized over the preceding job (step S27).

In a case where the image processing has to be performed while the new job is prioritized over the preceding job (a case where the assessment in step S27 is Yes), the control unit 10 performs process 3 of step S29 (step S29).

Note that details of process 3 of step S29 will be described later in a description about FIG. 8A and FIG. 8B.

On the other hand, in a case where the image processing does not have to be performed while the new job is prioritized over the preceding job (a case where the assessment in step S27 is No), the control unit 10 performs process 4 of step S30 (step S30).

Note that details of process 4 of step S30 will be described later in a description about FIG. 9A and FIG. 9B.

Finally, after processes 1 to 4 are finished, the control unit 10 finishes the process.

Next, details of process 1 will be described based on FIG. 6A and FIG. 6B.

In step S261 in FIG. 6A, the control unit 10 of the subject device causes the network I/F unit 14 to transmit the image data related to the new job to the other device (step S261).

In this case, the control unit 10 causes the network I/F unit 14 to transmit the image data in association with an instruction on the image processing that the control unit 10 requests the other device to perform.

Then, in step S262, the control unit 10 executes the image processing of the image data related to the preceding job and the final process of the image processing result (step S262).

Subsequently, the control unit 10 finishes the process.

Note that processes of steps S261 and S262 may be performed parallelly.

On the other hand, in step S263 in FIG. 6B, the control unit 10 of the other device assesses whether or not the network I/F unit 14 receives the image data related to the new job from the subject device (step S263).

In a case where the network I/F unit 14 receives the image data related to the new job from the subject device (a case where the assessment in step S263 is Yes), in step S264, the control unit 10 executes the image processing of the image data related to the new job and the final process of the image processing result based on the instruction on the image processing received from the subject device (step S264).

Subsequently, the control unit 10 finishes the process.

On the other hand, in a case where the network I/F unit 14 does not receive the image data related to the new job from the subject device (a case where the assessment in step S263 is No), the control unit 10 repeats the assessment in step S263 (step S263).

Next, details of process 2 will be described based on FIG. 7A and FIG. 7B.

In step S281 in FIG. 7A, the control unit 10 of the subject device causes the network I/F unit 14 to transmit the image data related to the preceding job to the other device (step S281).

In this case, the control unit 10 causes the network I/F unit 14 to transmit the image data in association with an instruction on the image processing that the control unit 10 requests the other device to perform.

Then, in step S282, the control unit 10 executes the image processing of the image data related to the new job and the final process of the image processing result (step S282).

Subsequently, the control unit 10 finishes the process.

Note that processes of steps S281 and S282 may be performed parallelly.

On the other hand, in step S283 in FIG. 7B, the control unit 10 of the other device assesses whether or not the network I/F unit 14 receives the image data related to the preceding job from the subject device (step S283).

In a case where the network I/F unit 14 receives the image data related to the preceding job from the subject device (a case where the assessment in step S283 is Yes), in step S284, the control unit 10 executes the image processing of the image data related to the preceding job and the final process of the image processing result based on the instruction on the image processing received from the subject device (step S284).

Subsequently, the control unit 10 finishes the process.

On the other hand, in a case where the network I/F unit 14 does not receive the image data related to the preceding job from the subject device (a case where the assessment in step S283 is No), the control unit 10 repeats the assessment in step S283 (step S283).

Next, details of process 3 will be described based on FIG. 8A and FIG. 8B.

In step S291 in FIG. 8A, the control unit 10 of the subject device causes the network I/F unit 14 to transmit the image data related to the preceding job to the other device (step S291).

In this case, the control unit 10 causes the network I/F unit 14 to transmit the image data in association with an instruction on the image processing that the control unit 10 requests the other device to perform.

Then, in step S292, the control unit 10 executes the image processing of the image data related to the new job and the final process of the image processing result (step S292).

Next, in step S293, the control unit 10 assesses whether or not the network I/F unit 14 receives the image processing result related to the preceding job from the other device (step S293).

In a case where the network I/F unit 14 receives the image processing result related to the preceding job from the other device (a case where the assessment in step S293 is Yes), in step S294, the control unit 10 executes the final process of the image processing result related to the preceding job based on the instruction on the image processing received from the subject device (step S294).

Subsequently, the control unit 10 finishes the process.

Note that the control unit 10 may parallelly perform processes of steps S291, S293, and S294, which are related to the preceding job, and a process of step S292, which is related to the new job.

On the other hand, in step S295 in FIG. 8B, the control unit 10 of the other device assesses whether or not the network I/F unit 14 receives the image data related to the preceding job from the subject device (step S295).

In a case where the network I/F unit 14 receives the image data related to the preceding job from the subject device (a case where the assessment in step S295 is Yes), in step S296, the control unit 10 causes the image processing unit 103 to execute the image processing of the image data related to the preceding job (step S296).

In next step S297, the control unit 10 causes the network I/F unit 14 to transmit the image processing result related to the preceding job to the subject device (step S297).

Subsequently, the control unit 10 finishes the process.

On the other hand, in a case where the network I/F unit 14 does not receive the image data related to the preceding job from the subject device (a case where the assessment in step S295 is No), the control unit 10 repeats the assessment in step S295 (step S295).

In such a manner, in a case where the preceding job is present when the new job is accepted, whether or not the preceding job is to be entrusted to the other device is decided in accordance with whether or not the new job and the preceding job are concluded only in the subject device. Thus, the image processing system 100 may be realized which enables appropriate allocation of image processing in accordance with the kind of job.

Next, details of process 4 will be described based on FIG. 9A and FIG. 9B.

In step S301 in FIG. 9A, the control unit 10 of the subject device causes the network I/F unit 14 to transmit the image data related to the new job to the other device (step S301).

In this case, the control unit 10 causes the network I/F unit 14 to transmit the image data in association with an instruction on the image processing that the control unit 10 requests the other device to perform.

Then, in step S302, the control unit 10 executes the image processing of the image data related to the preceding job and the final process of the image processing result (step S302).

Next, in step S303, the control unit 10 assesses whether or not the network I/F unit 14 receives the image processing result related to the new job from the other device (step S303).

In a case where the network I/F unit 14 receives the image processing result related to the new job from the other device (a case where the assessment in step S303 is Yes), in step S304, the control unit 10 executes the final process of the image processing result related to the new job based on the instruction on the image processing received from the subject device (step S304).

Subsequently, the control unit 10 finishes the process.

Note that the control unit 10 may parallelly perform processes of steps S301, S303, and S304, which are related to the new job, and a process of step S302.

On the other hand, in step S305 in FIG. 9B, the control unit 10 of the other device assesses whether or not the network I/F unit 14 receives the image data related to the new job from the subject device (step S305).

In a case where the network I/F unit 14 receives the image data related to the new job from the subject device (a case where the assessment in step S305 is Yes), in step S306, the control unit 10 causes the image processing unit 103 to execute the image processing of the image data related to the new job (step S306).

In next step S307, the control unit 10 causes the network I/F unit 14 to transmit the image processing result related to the new job to the subject device (step S307).

Subsequently, the control unit 10 finishes the process.

On the other hand, in a case where the network I/F unit 14 does not receive the image data related to the new job from the subject device (a case where the assessment in step S305 is No), the control unit 10 repeats the assessment in step S305 (step S305).

Third Embodiment

Next, a configuration of the image processing system 100 according to a third embodiment of the present disclosure will be described based on FIG. 10 to FIG. 12.

Figure 10:
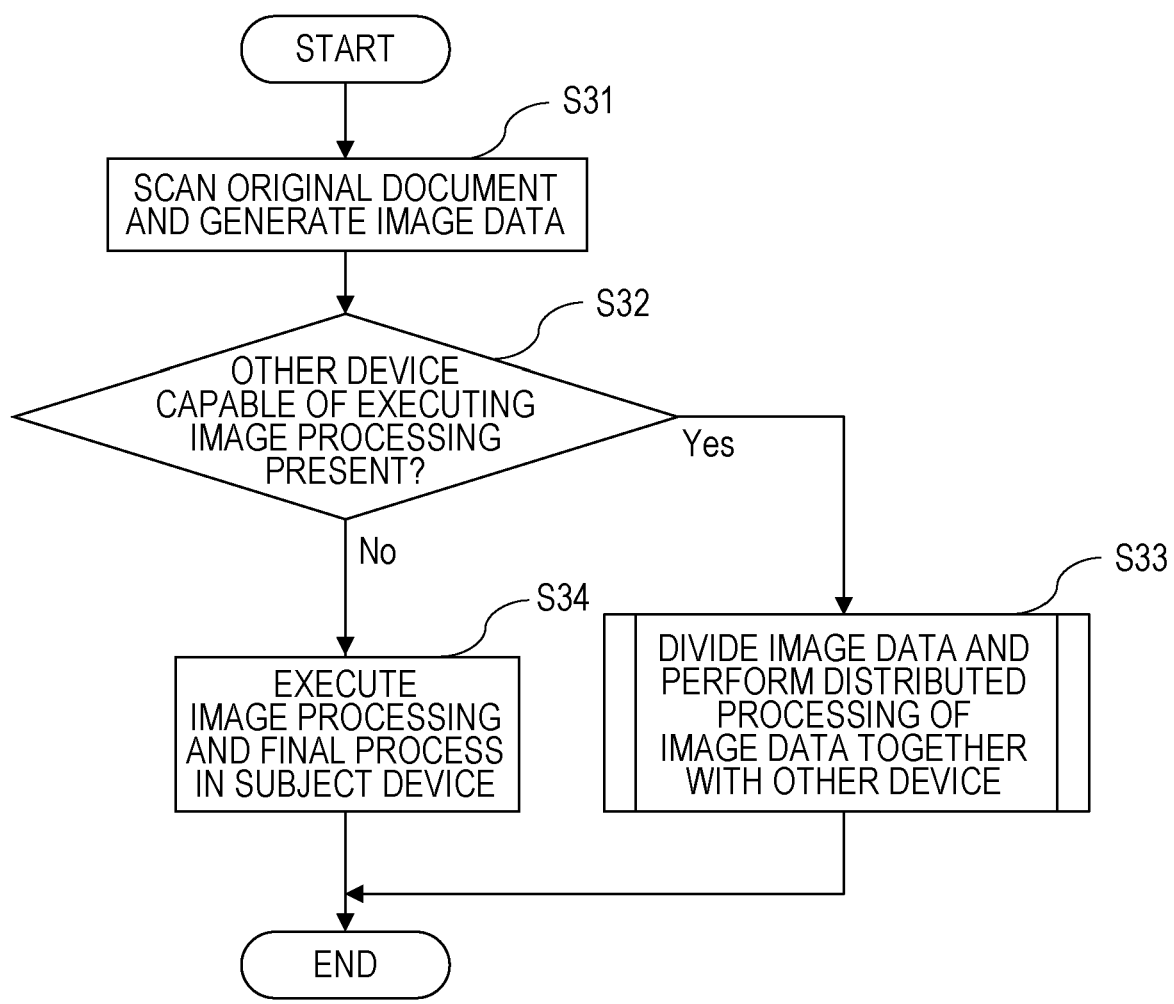
FIG. 10 is a flowchart that illustrates image processing procedures of the image processing device which scans an original document in the image processing system according to a third embodiment of the present disclosure.

FIG. 10 is a flowchart that illustrates one example of image processing procedures of the image processing device 1 which scans an original document in the image processing system 100 according to the second embodiment of the present disclosure. Further, FIG. 11 is a flowchart that illustrates one example of image processing procedures of the image processing device 1 (subject device) which scans an original document in the image processing system 100 according to the second embodiment of the present disclosure. Further, FIG. 12 is a flowchart that illustrates one example of image processing procedures of the image processing device 1 (other device) which receives image data in the image processing system 100 according to the first embodiment of the present disclosure.

Figure 11:
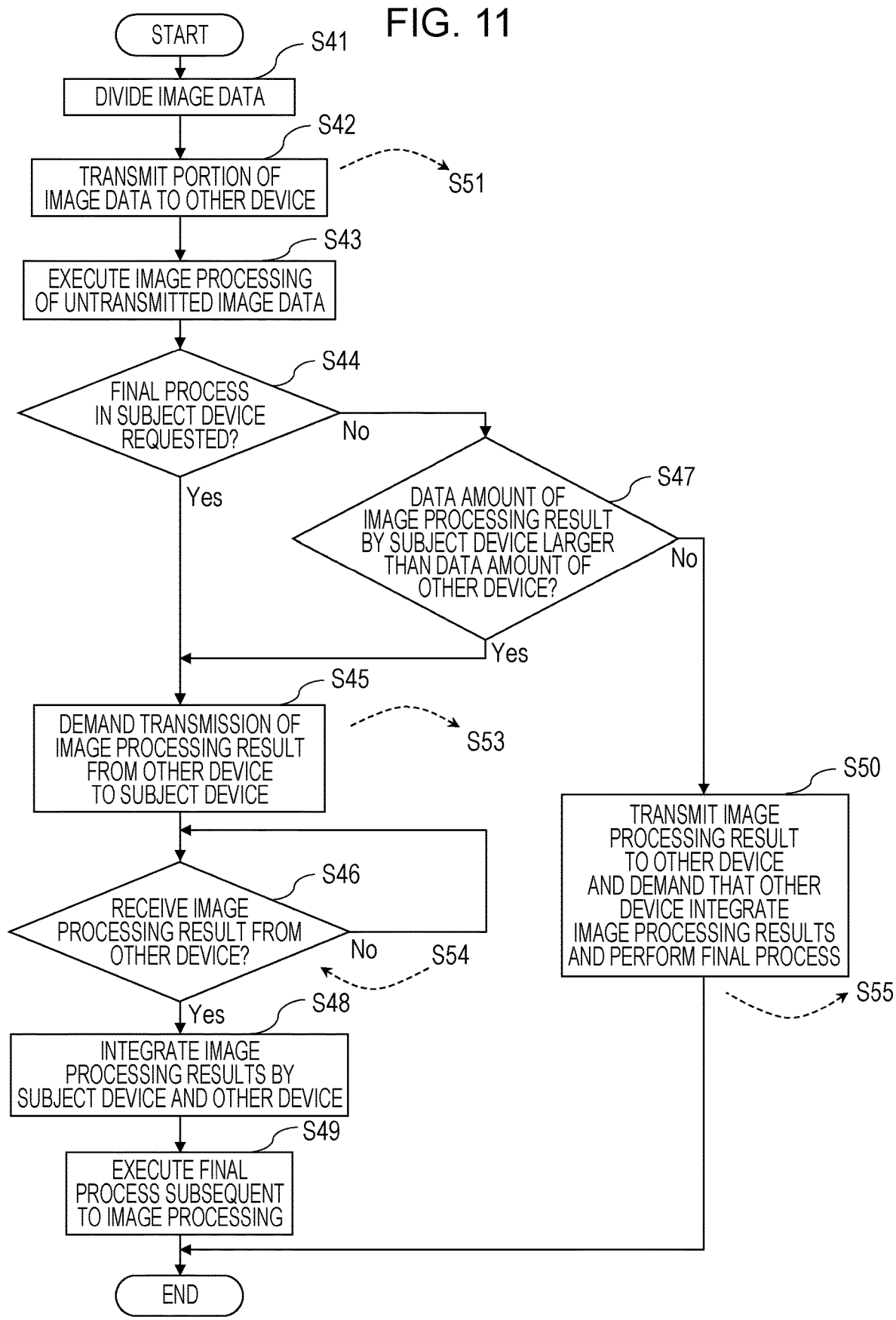
FIG. 11 is a flowchart that illustrates image processing procedures of the image processing device (subject device) which scans an original document in the image processing system according to the third embodiment of the present disclosure.
Figure 12:
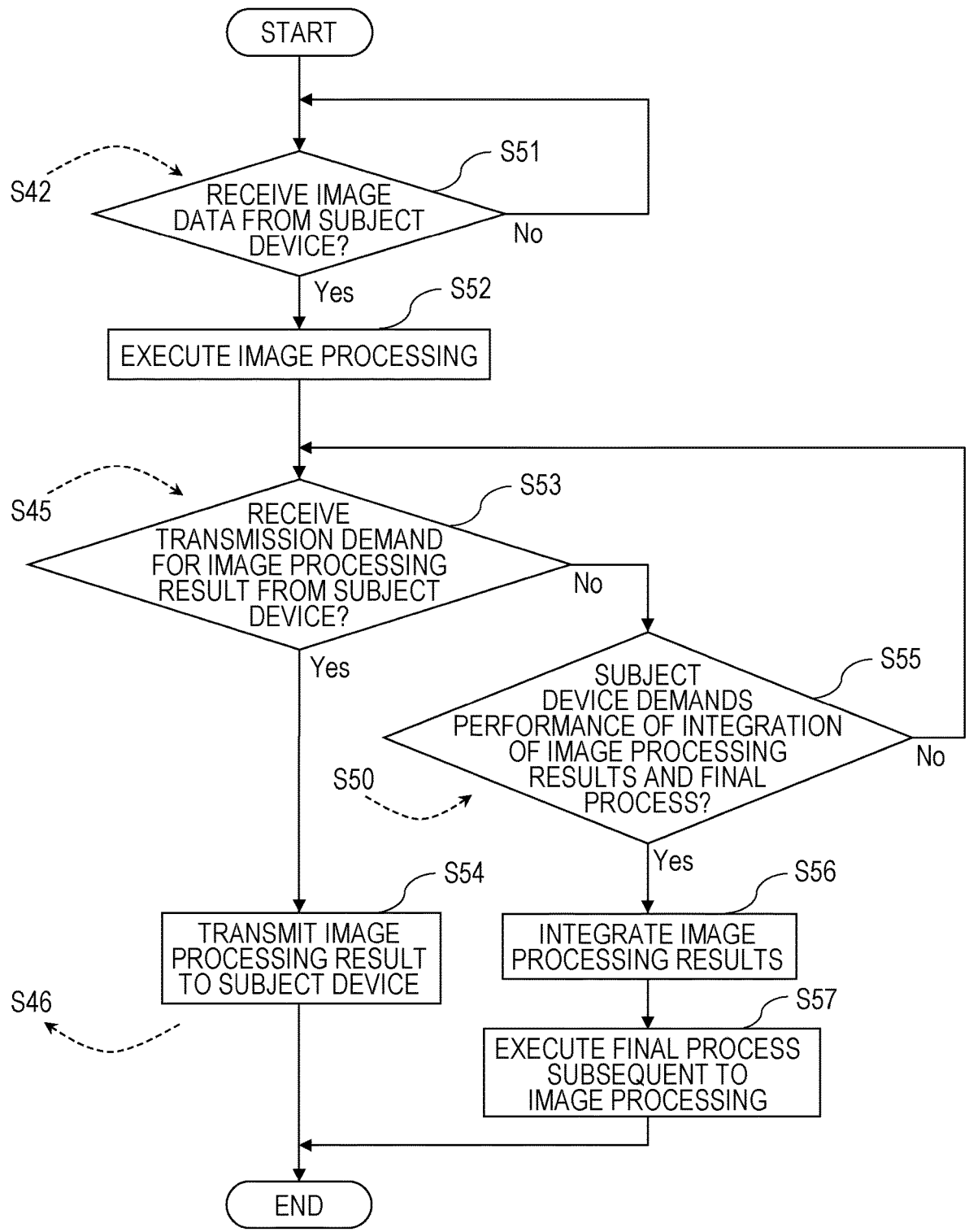
FIG. 12 is a flowchart that illustrates image processing procedures of the image processing device (other device) which receives image data in the image processing system according to the third embodiment of the present disclosure.

Note that processes of steps S42, S45, S46, and S50 in FIG. 11 respectively correspond to processes of steps S51, S53, S54, and S55 in FIG. 12.

In the third embodiment, a description will be made about a case where when the one image processing device 1 (subject device) accepts a job, the image data related to the job are divided, and distributed processing is performed together with the other image processing device 1 (other device).

In step S31 in FIG. 10, the control unit 10 of the image processing device 1 (subject device) causes the scanner unit 11 to scan an original document and generates image data (step S31).

Next, in step S32, the control unit 10 assesses whether or not the other image processing device 1 (other device) that is capable of executing image processing is present (step S32).

In a case where the other image processing device 1 (other device) that is capable of executing image processing is present (a case where the assessment in step S32 is Yes), in step S33, the control unit 10 divides the image data related to the job and performs the distributed processing of the image data together with the other device (step S33).

Subsequently, the control unit 10 finishes the process.

On the other hand, in a case where the other image processing device 1 (other device) that is capable of executing image processing is not present (a case where the assessment in step S32 is No), in step S34, the control unit 10 executes the image processing and the final process of the image processing result in the subject device (step S34).

Subsequently, the control unit 10 finishes the image processing.

Next, details of the distributed processing in step S33 in FIG. 10 will be described.

In step S41 in FIG. 11, the control unit 10 of the subject device divides the image data (step S41).

Here, in division of the image data, the image data may be divided such that the data amounts are equivalent or may be divided in accordance with processing performance that is decided by a CPU or the like mounted on each processing device.

Next, in step S42, the control unit 10 causes the network I/F unit 14 to transmit a portion of the divided image data to the other device (step S42).

In this case, the control unit 10 causes the network I/F unit 14 to transmit the image data in association with an instruction on the image processing that the control unit 10 requests the other device to perform.

Here, which image data among the divided image data are to be transmitted to the other device is decided in accordance with a dividing reference. In a case where the division is performed such that the data amounts are equivalent, a latter half portion of the divided data is transmitted to the other device. Further, in a case where the division is performed in consideration of the processing performance of the subject device and the other device, the data that are divided for processing by the other device are transmitted to the other device.

Next, in step S43, the control unit 10 causes the image processing unit 103 to execute the image processing of untransmitted image data (step S43).

Next, in step S44, the control unit 10 assesses whether or not the final process of the image processing result related to the job is requested in the subject device (step S44).

In a case where the final process is requested in the subject device (a case where the assessment in step S44 is Yes), in step S45, the control unit 10 causes the network I/F unit 14 to demand that the other device transmit the image processing result to the subject device (step S45).

Subsequently, the control unit 10 performs an assessment in step S46 (step S46).

On the other hand, in a case where the final process is not requested in the subject device (a case where the assessment in step S44 is No), the control unit 10 performs an assessment in step S47 (step S47).

Next, in step S46, the control unit 10 assesses whether or not the network I/F unit 14 receives the image processing result related to the job from the other device (step S46).

In a case where the network I/F unit 14 receives the image processing result related to the job from the other device (a case where the assessment in step S46 is Yes), in step S48, the control unit 10 integrates the image processing results, which are related to the job, by the subject device and the other device (step S48).

Subsequently, in step S49, the control unit 10 executes the final process subsequent to the image processing (step S49).

On the other hand, in step S46, in a case where the network I/F unit 14 does not receive the processed image data from the other device (a case where the assessment in step S46 is No), the control unit 10 repeats the assessment in step S46 (step S46).

Next, in step S47, the control unit 10 assesses whether or not the data amount of the image processing result by the subject device is larger than the data amount of the other device (step S47).

In a case where the data amount of the image processing result by the subject device is larger than the data amount of the other device (a case where the assessment in step S47 is Yes), the control unit 10 performs the process of step S45 (step S45).

On the other hand, in a case where the data amount of the image processing result by the subject device is not larger than the data amount of the other device (a case where the assessment in step S47 is No), in step S50, the control unit 10 causes the network I/F unit 14 to transmit the image processing result to the other device and demands that the other device integrate the image processing results and perform the final process (step S50).

Subsequently, the control unit 10 finishes the image processing.

In such a manner, because the image processing result with the smaller data amount is transmitted, the time for transmission may be made short.

Next, based on FIG. 12, a description will be made about a process by the other device to which the subject device entrusts the image processing.

In step S51 in FIG. 12, the control unit 10 of the other device assesses whether or not the network I/F unit 14 receives image data from the subject device (step S51).

In a case where the network I/F unit 14 receives the image data from the subject device (a case where the assessment in step S51 is Yes), in step S52, the control unit 10 causes the image processing unit 103 to execute the image processing of the image data based on the instruction on the image processing received from the subject device (step S52).

On the other hand, in a case where the network I/F unit 14 does not receive the image data from the subject device (a case where the assessment in step S51 is No), the control unit 10 repeats the assessment in step S51 (step S51).

Next, in step S53, the control unit 10 assesses whether or not the network I/F unit 14 receives a transmission demand for the image processing result related to the job from the subject device (step S53).

In a case where the network I/F unit 14 receives the transmission demand for the image processing result related to the job from the subject device (a case where the assessment in step S53 is Yes), in step S54, the control unit 10 causes the network I/F unit 14 to transmit the image processing results related to the job to the subject device (step S54).

On the other hand, in step S53, in a case where the network I/F unit 14 does not receive the transmission demand for the image processing result related to the job from the subject device (a case where the assessment in step S53 is No), in step S55, the control unit 10 assesses whether or not the network I/F unit 14 receives, from the subject device, a demand that the image processing result related to the job be received and integration of the image processing results, which are related to the job, by the subject device and the other device and the final process be performed (step S55).

In a case where the network I/F unit 14 receives, from the subject device, the demand that the image processing result related to the job be received and integration of the image processing results, which are related to the job, by the subject device and the other device and the final process be performed (a case where the assessment in step S55 is Yes), in step S56, the control unit 10 integrates the image processing results, which are related to the job, by the subject device and the other device (step S56).

Then, in step S57, the control unit 10 executes the final process subsequent to the image processing (step S57).

On the other hand, in step S55, in a case where the network I/F unit 14 does not receive, from the subject device, the demand that the image processing result related to the job be received and integration of the image processing results, which are related to the job, by the subject device and the other device and the final process be performed (a case where the assessment in step S55 is No), the control unit 10 repeats the assessment in step S55 (step S55).

In such a manner, in a case where distributed processing of the image data is performed with the other device, whether or not the image data are returned to the subject device is decided in accordance with whether or not the final process in the subject device is requested or whether or not the data amount of the image processing result, which is related to the job, by the subject device is larger than the data amount of the other device, and the image processing system 100 may thereby be realized which enables appropriate allocation of image processing in accordance with the kind of job.

Fourth Embodiment

In the first embodiment, the control unit 10 of the other device assesses whether or not the image processing result is to be returned to the subject device (step S13 in FIG. 4). However, the assessment may be performed by the control unit 10 of the subject device, and a demand that the image processing result be returned to the subject device may be transmitted to the other device.

Accordingly, an assessment related to allocation of the image processing may be centralized in the one image processing device 1. Thus, the image processing system 100 may be realized which enables appropriate processing.

Fifth Embodiment

As a fifth embodiment, a process may be performed in which the first and third embodiments are combined.

That is, in a case where the job is not a job that is concluded only in the subject device, the image data may be divided into two or more portions, and the image processing of the divided image data may respectively be entrusted to the two or more other devices.

In this case, any one among the two or more other devices integrates the image processing results and executes the final process.

Accordingly, in a case where the job is not a job that is concluded only in the subject device, the image processing is distributed to the two or more other image processing devices 1. Thus, the image processing system 100 may be realized which enables appropriate and efficient allocation of image processing in accordance with the kind of job.

Sixth Embodiment

As a sixth embodiment, a process may be performed in which the second and third embodiments are combined.

That is, in a case where a preceding job is already accepted when the one image processing device 1 accepts a new job, a case is possible where the image data related to the new job and/or the preceding job are divided and distributed processing is performed between the subject device and the other device.

Accordingly, even in a case where both of the new job and the preceding job are accepted, distributed processing is performed between the subject device and the other device while the image data related to the new job and/or the preceding job are divided, and the image processing system 100 may thereby be realized which enables appropriate and efficient allocation of image processing in accordance with the kind of job.

Seventh Embodiment

In the third embodiment, in a case where the two or more other devices are present which are capable of executing the image processing, the image data may be divided into three or more portions, and the image processing of the divided image data may respectively be entrusted to the subject device and the two or more other devices.

Accordingly, because the image processing is distributed to the three or more image processing devices 1, the image processing system 100 may be realized which enables appropriate and efficient allocation of image processing in accordance with the kind of job.

Desirable embodiments of the present disclosure include embodiments in which any of plural above-described embodiments are combined.

Various kinds of modification examples of the present disclosure are possible other than the above-described embodiments. It is not to be understood that those modification examples do not belong to the scope of the present disclosure. The present disclosure is to include all modifications within meanings equivalent to the claims and the scope thereof.

The present disclosure contains subject matter related to that disclosed in Japanese Priority Patent Application JP 2017-217345 filed in the Japan Patent Office on Nov. 10, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing system comprising:
    plural image processing devices that are connected with each other by a network,
    wherein each of the image processing devices includes
        a processor; and
        a memory storing instructions, when executed by the processor, cause the image processing device to:
        accept a job related to image processing,
        perform image processing of image data related to the job, and
        perform communication with the other image processing device on the network,
    wherein in the one image processing device, the image data related to the job accepted is transmitted to the other image processing device that is capable of image processing and causes the other image processing device to execute the image processing, and
    wherein in the other image processing device, whether or not an image processing result is to be returned to the one image processing device is assessed, and the image processing result is transmitted to the one image processing device to cause the one image processing device to execute a final process in a case where an assessment is made by the other image processing device that the image processing result is to be returned, but the final process of the image processing result in the other image processing device is executed in a case where an assessment is made by the other image processing device that the image processing result is not to be returned, and
    wherein in the one image processing device, in a case where a new job accepted is not able to be immediately executed due to a preceding job, whether or not the new job is concluded only in the one image processing device is assessed, and the image data related to the new job is transmitted to the other image processing device that is capable of the image processing to cause the other image processing device to execute the image processing in a case where an assessment is made that the new job is not a job that is concluded only in the one image processing device.

2. The image processing system according to claim 1, wherein the assessment is made based on a purpose of the image processing result.

3. An image processing method of an image processing system including plural image processing devices that are connected with each other by a network, the image processing method comprising:
- in the one image processing device, transmitting image data related to the job to the other image processing device that is capable of image processing and causing the other image processing device to execute the image processing;
- assessing whether or not an image processing result is to be returned to the one image processing device in the other image processing device; and
- transmitting the image processing result to the one image processing device to cause the one image processing device to execute a final process in a case where an assessment is made by the other image processing device that the image processing result is to be returned, but executing the final process of the image processing result in the other image processing device in a case where an assessment is made by the other image processing device that the image processing result is not to be returned,
- wherein in the one image processing device, in a case where a new job accepted is not able to be immediately executed due to a preceding job, whether or not the new job is concluded only in the one image processing device is assessed, and the image data related to the new job is transmitted to the other image processing device that is capable of the image processing to cause the other image processing device to execute the image processing in a case where an assessment is made that the new job is not a job that is concluded only in the one image processing device.

4. A non-transitory computer readable storage medium storing an image processing program that is executed by an image processing system including plural image processing devices which are connected with each other by a network, the image processing program causing a processor of the image processing device to execute a process comprising:
- in the one image processing device, in a case where an accepted job is not able to be immediately executed, transmitting image data related to the job to the other image processing device that is capable of image processing and causing the other image processing device to execute the image processing;
- assessing whether or not an image processing result is to be returned to the one image processing device in the other image processing device; and
- transmitting the image processing result to the one image processing device to cause the one image processing device to execute a final process in a case where an assessment is made by the other image processing device that the image processing result is to be returned, but executing the final process of the image processing result in the other image processing device in a case where an assessment is made by the other image processing device that the image processing result is not to be returned,
- wherein in the one image processing device, in a case where a new job accepted is not able to be immediately executed due to a preceding job, whether or not the new job is concluded only in the one image processing device is assessed, and the image data related to the new job is transmitted to the other image processing device that is capable of the image processing to cause the other image processing device to execute the image processing in a case where an assessment is made that the new job is not a job that is concluded only in the one image processing device.

5. An image processing system comprising:
- plural image processing devices that are connected with each other by a network,
- wherein each of the image processing devices includes
  - a processor; and
  - a memory storing instructions, when executed by the processor, cause the image processing device to:
  - accept a job related to image processing,
  - perform image processing of image data related to the job, and
  - perform communication with the other image processing device on the network,
- wherein in the one image processing device, the image data related to the job accepted is transmitted to the other image processing device that is capable of image processing and causes the other image processing device to execute the image processing, and
- wherein in the other image processing device, whether or not an image processing result is to be returned to the one image processing device is assessed, and the image processing result is transmitted to the one image processing device to cause the one image processing device to execute a final process in a case where an assessment is made by the other image processing device that the image processing result is to be returned, but the final process of the image processing result in the other image processing device is executed in a case where an assessment is made by the other image processing device that the image processing result is not to be returned, and
- wherein in the one image processing device, in a case where a new job accepted is not able to be immediately executed due to a preceding job, whether or not the preceding job is concluded only in the one image processing device is assessed, and the image data related to the preceding job is transmitted to the other image processing device that is capable of the image processing to cause the other image processing device to execute the image processing in a case where an assessment is made that the preceding job is not a job that is concluded only in the one image processing device.

6. An image processing system comprising:
- plural image processing devices that are connected with each other by a network,
- wherein each of the image processing devices includes
  - a processor; and
  - a memory storing instructions, when executed by the processor, cause the image processing device to:
  - accept a job related to image processing,
  - perform image processing of image data related to the job, and
  - perform communication with the other image processing device on the network,
- wherein in the one image processing device, the image data related to the job accepted is transmitted to the other image processing device that is capable of image processing and causes the other image processing device to execute the image processing, and
- wherein in the other image processing device, whether or not an image processing result is to be returned to the one image processing device is assessed, and the image processing result is transmitted to the one image processing device to cause the one image processing device to execute a final process in a case where an assessment is made by the other image processing device that the image processing result is to be returned, but the final process of the image processing result in the other image processing device is executed in a case where an assessment is made by the other image processing device that the image processing result is not to be returned, and wherein in the one image processing device, in a case where a new job accepted is not able to be immediately executed due to a preceding job, whether or not the new job and the preceding job are concluded only in the one image processing device is assessed, whether or not the new job is to be prioritized over the preceding job in a case where an assessment is made that both of the new job and the preceding job are concluded only in the one image processing device is assessed, and the image data related to the preceding job is transmitted to the other image processing device that is capable of the image processing to cause the other image processing device to execute the image processing in a case where an assessment is made that the new job is to be prioritized over the preceding job.

* * * * *